Oct. 3, 1950     W. V. THELANDER     2,524,147
FRICTION CLUTCH PLATE
Filed March 18, 1949
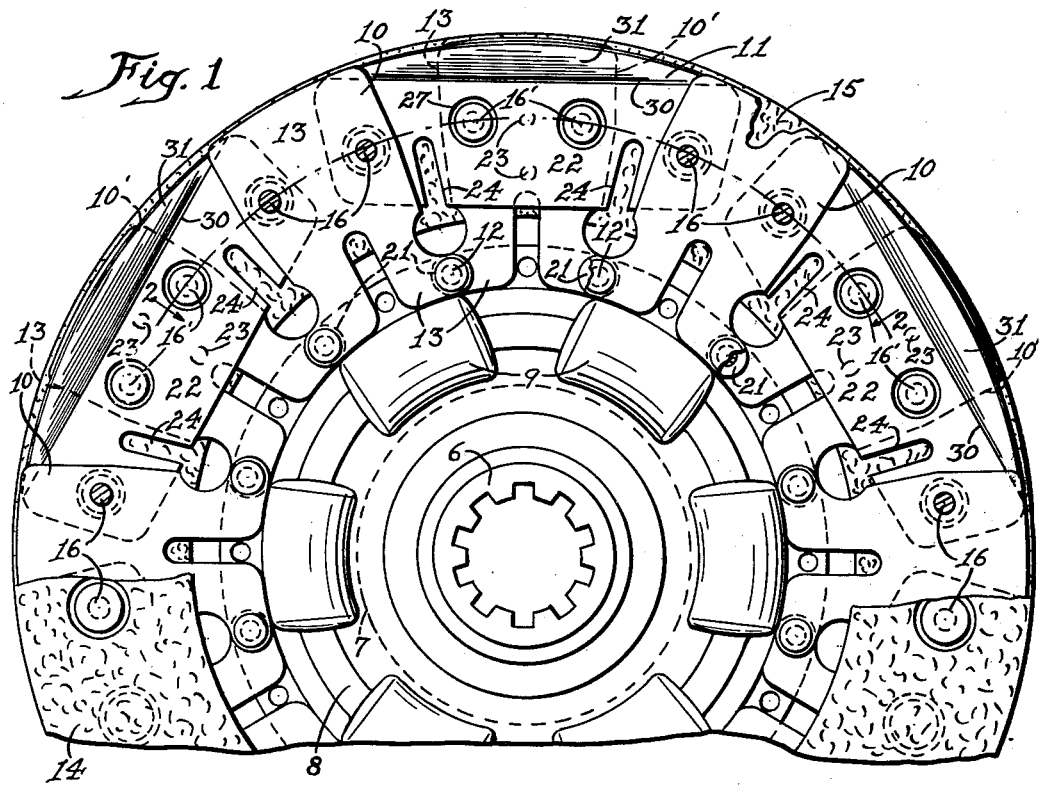
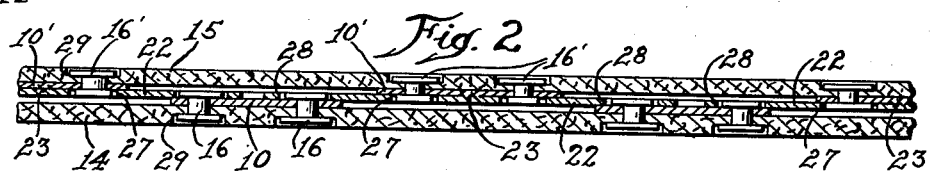
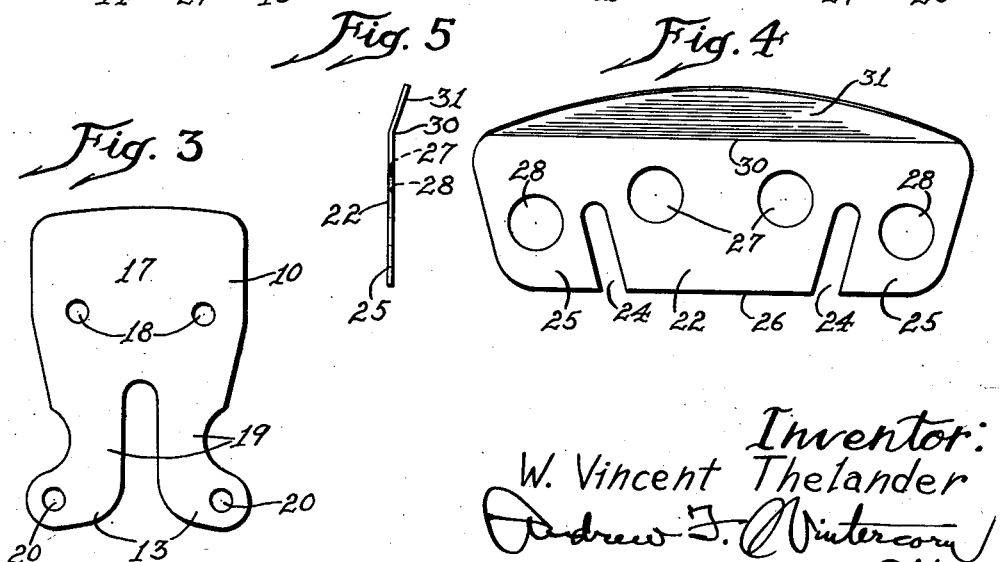
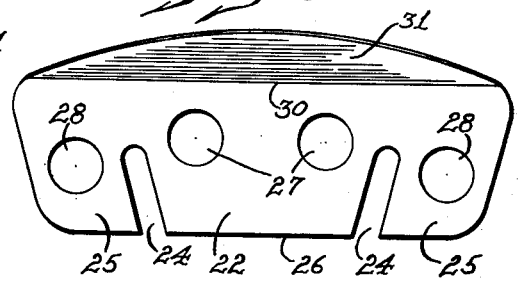
Inventor:
W. Vincent Thelander
Andrew F. Wintercorn
atty.

Patented Oct. 3, 1950

2,524,147

UNITED STATES PATENT OFFICE 2,524,147

FRICTION CLUTCH PLATE

W. Vincent Thelander, Auburn, Ind., assignor to Dana Corporation, Toledo, Ohio, a corporation of Virginia Application March 18, 1949, Serial No. 82,253

2 Claims. (Cl. 192—107)

This invention relates to friction clutch plates for automotive use and is particularly concerned with improvements upon the "mush" construction of the plate disclosed in my copending application, Serial No. 568,664, filed December 18, 1944, which resulted in Patent No. 2,477,016, issued July 26, 1949.

The plate disclosed in the copending application is of sectional construction utilizing a number of small sheet metal stampings to build up the outer annular portion on which the annular facings are mounted, it being possible to produce these stampings with much less waste than is involved in the stamping of large disks, and it being also possible to produce these stampings from salvaged scrap material, so that said structure is made available at a much lower cost than would otherwise be possible. The plate is further so designed that all of the sheet metal stampings carrying the annular facings are of identical form, thus further reducing the cost of manufacture and simplifying as well as speeding up assembling.

A salient feature of the plate of said copending application is the provision of flat leaf-springs which can be produced to the desired uniformity at much lower cost than specially shaped leaf-springs, and the use of which as compared with the conventional struck-out ears commonly provided as integral portions of clutch plates means an appreciable saving in cost by reason of the fact that it makes possible the use of ordinary sheet metal stampings for the plate proper instead of spring steel. In the aforesaid construction the sheet metal stampings on which the annular facings are mounted are arranged in two series, the circumferentially spaced stampings of one series carrying the flat leaf-springs being disposed in staggered relation to the circumferentially spaced stampings of the other series, and the flat leaf-springs overlapping the last-mentioned stampings so as to be flexed when the plate is compacted between the pressure plate and flywheel. With that construction there is no difficulty in obtaining clutch plates in quantity production of uniform thickness in the facing portion and with the facings in substantial parallelism throughout the circumference, whereas with the other earlier constructions, such uniformity in thickness and parallelism of facings was not obtained, and as a result such plates when installed would not give as good performance nor would they last as long as could otherwise be expected.

The present invention has for its principal object the provision of flat leaf springs for the cushioning action as described above but having a longitudinally extending bend or crimp provided therein so that the radially outer portion is caused to extend at an acute angle relative to the plane of the radially inner portion, for the purposes of:

(1) Obtaining increased pressure on the facings at the O. D. in plates where too much pressure was otherwise concentrated at the I. D. and not enough at the O. D., it being clear that the flattening of the angular portion of the leaf spring necessitates heavy pressure on the O. D., thereby distributing wear on that portion of the facings that might otherwise not assume its proper share of the wear;

(2) The bend or crimp reaching lengthwise of the end portions of the leaf spring adding stiffness thereto so that it takes increased pressure to flex the same, thereby distributing wear on the facings to the areas on opposite sides of the area directly affected by the bend or crimp, as set forth above under (1), whereby to tend toward more uniform distribution of wear throughout the circumference of the facings, and (3) Insuring true straightness or flatness of the leaf springs to begin with and resisting bending to a permanently distorted or set condition.

The invention is illustrated in the accompanying drawing, in which—

Fig. 1 is a rear view of a clutch plate made in accordance with my invention, showing a portion of the friction facing removed to better illustrate the mush construction of my invention;

Fig. 2 is a sectional detail on the arcuate line 2—2 of Fig. 1;

Figs. 3 and 4 are detached face views of one of the sheet metal stampings and one of the flat but crimped leaf-springs, respectively, and Fig. 5 is an end view of the leaf spring, taken from the left hand end, to better illustrate the crimp feature.

The same reference numerals are applied to corresponding parts throughout the views.

The clutch plate shown comprises relatively rotatable inner and outer portions, the inner portion being formed by a center hub 6 splined for driving connection with the driving shaft of an automotive transmission, and provided with an annular flange 7 onto which a notched plate is riveted for oscillatory movement with the hub relative to the housing plates 8, in which pockets 9 are formed containing spring cushioning assemblies, so that when relative movement takes place between the hub 6 and housing plates 8, that is to say between the inner and outer portions of the clutch plate, the springs of said assemblies are compressed to cushion the drive. The recoil action of the springs is also suitably checked, and in that way the secondary vibrations are absorbed and a smoother drive is obtained.

The outer portion of the plate contains the mush construction with which my invention is particularly concerned. There are two series of stamped sheet metal segments 10 and 10', the circumferentially spaced segments 10 of one series being in staggered relation to the circumferentially spaced segments 10' of the other series, and the spaces between the segments of each series being wider than the segments, as is clearly indicated by the spaces 11 in Fig. 1, so that the segments, which are secured to the housing plates 8 by the rivets 12 entered through registering holes in the overlapping ends of the attaching portions 13 of the segments, are received in these spaces when the plate is compacted upon engagement of the clutch. That is to say, the segments 10 and 10' in the compacting of the outer portion of the plate will have their outer portions 13 brought more or less into coplanar relationship under pressure between the opposing drive faces of the flywheel and pressure plate in the engagement of the clutch. The friction facing rings or pads 14 and 15 are applied to the outer faces of the segments 10 and 10' by rivets 16 and 16', respectively, the facing ring 14 being arranged for engagement with the flywheel.

The stampings 10 and 10', as clearly appears in Figs. 1 and 3, are generally inverted U-shaped, the enlarged substantially rectangular middle portion 17 to which the facings are attached by the rivets 16 and 16' entered in the holes 18, forming the crossbar of the U and the attaching portions 13 the lower ends of the legs 19 of the U. The rivets 12 for fastening the segments to the flanged rims of the housing plates 8 are entered through holes 20 in the outer ends of the attaching portions 13. The narrowness of the leg portions 19 in relation to the width of the outer end portion 17 gives the desired yield or flexibility in these segments 10 and 10' to permit compacting of the outer portion of the plate in the manner described. Washers 21 may or may not be interposed between the segments 10 and 10', one at each rivet 12, so as to space the outer portions 17 in parallel planes and leave room between the two planes of the segments for flat leaf-springs 22, which are of approximately the same thickness as the washers 21, or less. There is one of these flat leaf-springs spot welded, or otherwise suitably secured, as indicated at 23, to each of the stampings 10' on the middle of the inner face of the rectangular outer portion 17 thereof. Each of these flat leaf-springs is elongated and generally segmental shaped, and is slotted along radial lines on both sides of the middle portion, as at 24, in register with the spaces 11 between neighboring segments to define end portions 25 which are arranged in overlapping relation to segments 10. The radial slots 24 extend outwardly from the inner edge 26 of the leaf spring 22 far enough to enable easier deflection of the end portions 25 in the plane of the segments 10 while the middle portion remains in the plane of the supporting segment 10', when the plate is compacted. Holes 27 in the middle portion of the leaf spring 22 register with and provide clearance for the heads on the inner ends of rivets 16'. The other holes 28 in the end portions 25 are to provide clearance for the heads on the inner ends of rivets 16. There is, therefore, no interference with the "packing" tightly together of the parts in the engagement of the clutch. The heads on the outer ends of rivets 16 and 16' are counter-sunk as shown at 29 in Fig. 2.

It will now be seen that each segmental shaped leaf spring 22 is bent or "crimped" as indicated by the line 30 so that the relatively narrow radially outer portion 31 is made to extend at an acute angle relative to the plane of the main body portion of the leaf spring. In that way increased pressure on the facings 14 and 15 is secured at the O. D. in plates where too much pressure was otherwise concentrated at the I. D. and not enough at the O. D. This is because it requires heavier pressure at the O. D. to flatten the angular portion 31 of each leaf spring, thereby distributing wear on that portion of the facings that might otherwise not assume its proper share of the wear. Moreover, the bend or crimp at 30 reaching lengthwise of the end portions 25 of the leaf spring adds stiffness to these portions so that it requires increased pressure on segments 10 to flex these end portions 25, thereby distributing wear on the facings 14 and 15 to the areas on opposite sides of the area directly affected by the bent portion 31, whereby to tend toward more uniform distribution of wear throughout the circumference of the facings. Then too, it will be clear that the bend or crimp at 30 tends to make for a more truly flat condition in the main body portion of the leaf spring and to keep it flat throughout its life and reduce likelihood of the end portions taking a set in a distorted condition.

In operation, it should be clear that when the pressure plate is moved toward the flywheel in the engagement of the clutch, the facings 14 and 15 are pressed together, thereby flexing the segments 10 and 10' toward coplanar relationship and correspondingly flexing the end portions 25 of all of the leaf springs 22, the spring pressure of all of these leaf-springs tending to keep the facings 14 and 15 apart, insuring the desired smooth engagement of the clutch and avoiding grabbing. The leaf-springs 22 being normally flat will, of course, exert increasing spring pressure on the facings 14 and 15 as they approach fully engaged relationship, the outer portion of the clutch plate being tightly packed between the pressure plate and flywheel when the clutch is fully engaged. The bent portions 31 of the leaf springs necessitate an increase in the pressure needed to "pack" the plate, and cause wear to be distributed to the O. D. of the facings where it might otherwise not occur, and, obviously the farther out the drive is taken the better from the standpoint of less slippage, less wear, and higher torque. When the clutch is disengaged, the leaf-springs 22 return to the flat unflexed form and accordingly return the segments 10 and 10' to their normal spaced parallel relationship. The fact that all of the leaf-springs 22 are flat, as distinguished from specially formed bowed spring metal parts previously provided for mush purposes, makes for a clutch plate of uniformly increased thickness in the disengaged condition and therefore obviates the objection common in many other clutch plate constructions of non-uniform engagement and accordingly non-uniform and rapid wear of the clutch plate facings and a tendency for the clutch to grab. In other words, flat leaf-springs like those shown at 22 can be produced to the desired uniformity, whereas specially shaped parts cannot be produced to a desired uniformity without difficulty, which means close rigorous inspection and a high percentage of rejections in quantity production of clutch plates.

The fact that the segments 10 and 10' are of identical form and are therefore interchangeable results in an appreciable saving in the cost of production and simplifies and expedites assembling. Also the fact that the present mush construction requires spring steel only in the leaf-springs 22 is, of course, an important factor from the economy standpoint. The present construction, particularly as a result of the use of the flat leaf-springs 22 and also to some extent as a result of the use of identical-shaped stampings throughout, insures close uniformity as to thickness of plates throughout their circumference in quantity production.

It is believed the foregoing description conveys a good understanding of the objects and advantages of my invention. The appended claims have been drawn to cover all legitimate modifications and adaptations.

I claim:

1. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual, substantially flat, sheet metal friction-facing supports carried by said mounting means and extending in a generally radial direction and of equal radial length and attached to one friction facing only, each of said supports having an outer end portion disposed between said friction facings, and a substantially flat leaf spring elongated in a direction circumferentially of the facings and supported in transverse abutting relation on the outer end portion of each of said supports and having flexible resilient end portions projecting circumferentially from opposite sides of said support, a radially outer end portion of each leaf spring which is of appreciable radial extent being bent along a straight line into a plane at an acute angle to the plane of the rest of the leaf spring so as to provide a flattenable resilient cushion portion between the radially outer marginal portions of the friction facings, the said bent portions being resistant to flattening into the plane of the leaf springs so as to resist axial movement of the friction facings toward one another under clutch packing pressure and thereby increase the spring pressure of clutch engagement in that region, and other substantially flat, sheet metal friction facing supports carried by said mounting means and extending in a generally radial direction as the first mentioned supports but attached only to said other friction facing and disposed in circumferentially spaced relation so as to be located in the spaces between the first-mentioned supports, the latter friction facing supports having their outer end portions disposed between said friction facings with their opposed lateral edge portions in overlapping engagement with the flexible end portions of said leaf springs to effect flexing thereof yieldingly to resist axial movement of one friction facing toward the other friction facing under clutch packing pressure, the straight line of bend of said angular bent portion in each leaf spring extending transversely of the flexible end portions of the leaf spring, whereby to increase their resistance to flexing.

2. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual, substantially flat, sheet metal friction-facing supports carried by said mounting means and extending in a generally radial direction and of equal radial length and attached to one friction facing only, each of said supports having an outer end portion disposed between said friction facings, and a substantially flat leaf spring elongated in a direction circumferentially of the facings and supported in transverse abutting relation on the outer end portion of each of said supports and having a flexible resilient end portion projecting circumferentially from one side of said support, a radially outer end portion of said circumferentially extending outer end portion which is of appreciable radial extent being bent along a single straight line into a plane at an acute angle to the plane of the rest of said substantially flat support so as to provide a flattenable resilient cushion portion between the radially outer marginal portions of the friction facings, the said bent portion being resistant to the flattening so as to resist axial movement of the radially outer marginal portions of the friction facings toward one another under clutch packing pressure and thereby increase the spring pressure of clutch engagement in that region, and other substantially flat, sheet metal friction facing supports carried by said mounting means and extending in a generally radial direction as the first-mentioned supports but attached only to said other friction facing and disposed in circumferentially spaced relation so as to be located in the spaces between the first-mentioned supports, the latter friction facing supports having their outer end portions disposed between said friction facings and having lateral edge portions thereof disposed in overlapping engagement with the flexible end portions of said leaf springs to effect flexing thereof yieldingly to resist axial movement of one friction facing toward the other friction facing under clutch packing pressure, the straight line bend of said angular bent portion of each leaf spring extending transversely of the flexible end portion of the leaf spring, whereby to increase its resistance to flexing.

W. VINCENT THELANDER.

REFERENCES CITED

The following references are of record in the file of this patent:

UNITED STATES PATENTS

| Number | Name | Date |
|---|---|---|
| 1,685,983 | Church | Oct. 2, 1928 |
| 2,309,950 | Goodwin | Feb. 2, 1943 |
| 2,333,308 | Goodwin | Nov. 2, 1943 |
| 2,337,135 | Thelander | Dec. 21, 1943 |
| 2,339,430 | Saks | Jan. 18, 1944 |
| 2,391,495 | Wemp | Dec. 25, 1945 |
| 2,477,016 | Thelander | July 26, 1949 |

FOREIGN PATENTS

| Number | Country | Date |
|---|---|---|
| 482,808 | Great Britain | Apr. 5, 1938 |
| 565,152 | France | Mar. 18, 1925 |